United States Patent
Sager et al.

(10) Patent No.: US 6,637,644 B2
(45) Date of Patent: Oct. 28, 2003

(54) METHOD OF MANUFACTURING HEAT INSULATING STRUCTURAL AND/OR LIGHT ELEMENTS AND INSTALLATION FOR CARRYING OUT THE METHOD

(75) Inventors: Kurt Sager, Dürrenäsch (CH); Emil Bächli, Marktgasse 7, CH-5304 Endingen (CH)

(73) Assignee: Emil Bächli, Endingen (CH)

( * ) Notice: Subject to any disclaimer, the term of this patent is extended or adjusted under 35 U.S.C. 154(b) by 0 days.

(21) Appl. No.: 10/042,939

(22) Filed: Jan. 9, 2002

(65) Prior Publication Data

US 2002/0088842 A1 Jul. 11, 2002

(30) Foreign Application Priority Data

Jan. 9, 2001 (EP) ............................ 01 810 024

(51) Int. Cl.$^7$ .............................................. B23K 31/02
(52) U.S. Cl. .............................. 228/122.1; 228/124.6; 228/254; 228/256
(58) Field of Search .................... 228/245, 246, 228/248.1, 254, 256, 124.6, 122.1; 428/34

(56) References Cited

U.S. PATENT DOCUMENTS

| | | | | |
|---|---|---|---|---|
| 2,756,467 A | * | 7/1956 | Elling ........................ 428/34 |
| 3,441,924 A | * | 4/1969 | Peek et al. .................. 340/550 |
| 3,544,294 A | * | 12/1970 | Goto ............................. 65/40 |
| 3,742,600 A | * | 7/1973 | Lowell ....................... 29/592.1 |
| 3,940,898 A | * | 3/1976 | Kaufman ................ 52/204.597 |
| 3,990,201 A | * | 11/1976 | Falbel ....................... 52/171.3 |
| 4,159,075 A | * | 6/1979 | Ljung et al. ................ 228/116 |
| 4,198,254 A | * | 4/1980 | Laroche et al. ............. 156/107 |
| 4,204,015 A | * | 5/1980 | Wardlaw et al. ............. 428/34 |
| 4,261,145 A | * | 4/1981 | Brocking ..................... 52/172 |
| 4,393,105 A | * | 7/1983 | Kreisman ..................... 428/34 |
| 4,455,796 A | * | 6/1984 | Schoofs ....................... 52/172 |
| 4,683,154 A | * | 7/1987 | Benson et al. ................ 428/34 |
| 4,854,495 A | * | 8/1989 | Yamamoto et al. ....... 228/124.1 |
| 4,941,302 A | * | 7/1990 | Barry ........................ 52/171.3 |
| 6,111,683 A | * | 8/2000 | Cammenga et al. ........ 359/267 |
| 6,216,939 B1 | * | 4/2001 | Thackara ................. 228/124.6 |
| 6,497,931 B1 | * | 12/2002 | Aggas ........................ 428/34 |

FOREIGN PATENT DOCUMENTS

| | | |
|---|---|---|
| DE | 2315673 | 10/1974 |
| DE | 3402323 | 8/1985 |
| WO | 8703327 | 6/1987 |

OTHER PUBLICATIONS

2002/0088842A1 Sager et al. (Jul. 11, 2002).*
2003/0029440A1 Gros et al. (Feb. 13, 2003).*

* cited by examiner

*Primary Examiner*—Tom Dunn
*Assistant Examiner*—Kiley Stoner
(74) *Attorney, Agent, or Firm*—Friedrich Kueffner

(57) ABSTRACT

A method of manufacturing heat-insulating structural and/or light elements composed of at least two wall elements of glass, a glass alloy or metal, wherein the wall elements are separated from each other by support elements and are provided on at least one of surfaces thereof facing each other with a layer reflecting heat radiation, and wherein the structural and/or light elements further are composed of a deformable sealing element for connecting the wall elements to obtain a hollow space between the wall elements which can be evacuated or supplied with gas. The method includes conveying wall elements which have been cleaned and coated on at least one surface thereof and are intended for a structural and/or light element in a manufacturing line extending over manufacturing sections, coating with solder at least one side of each wall element at edges thereof, placing spaced-apart support elements on a wall element, positioning the wall elements opposite each other at a distance determined by the support elements, and subsequently enclosing the wall elements to form a gas-tight hollow space between the wall elements by applying a deformable metal sealing element at the coated edges of both wall elements.

11 Claims, 2 Drawing Sheets

METHOD OF MANUFACTURING HEAT INSULATING STRUCTURAL AND/OR LIGHT ELEMENTS AND INSTALLATION FOR CARRYING OUT THE METHOD

BACKGROUND OF THE INVENTION

1. Field of the Invention

The present invention relates to a method of manufacturing heat insulating structural elements and/or light elements composed of at least two wall elements of glass, a glass alloy or metal separated from each other by support elements, wherein the wall elements have on at least one of the surfaces facing each other a heat radiation-reflecting layer; the structural and/or light elements further are composed of a deformable sealing element attached to the edges of the wall elements and connected to the wall elements to form a hollow space which can be evacuated or filled with gas.

2. Description of the Related Art

High insulation values make it possible to construct and utilize structures and insulations in an energy-saving and an environment-protecting manner. Insulation technology had a great significance not only since the climate conferences in which the member countries pledged to reduce their energy consumption and the CO2 output.

Consequently, it is necessary to reduce the heat transmission coefficient or K-coefficient in especially affected windows, windows, window-like doors and roof windows as well as other structural and light elements. However, such high insulation requirements cannot be met by conventional insulating glass and the method used for manufacturing the glass.

By comparison, the outer walls of a building can be constructed with a K-coefficient of 0.2 W/m2° K; however, the windows are far away from reaching such values and, therefore, are also called cold holes.

As is well known, windows, for example, windows with two or more panes, are manufactured by removing or cleaning foreign bodies or dirt from the surfaces of the individual panes in a noble gas atmosphere by means of cathodes which produce a combustion, and the cleaned surfaces are then coated with an infrared coating under similar ambient conditions. The infrared or low-E layer serves to prevent the heat transmission.

The coating is applied by magnetron sputtering in an evacuated tunnel having a length of about 50 m; accordingly, a large amount of energy and high technical and financial requirements are necessary.

At the end of the coating process, the glass panes are removed from the evacuated tunnel and are further processed in an atmospheric surrounding into gas-filled light elements or windows.

These complicated and expensive treatments have in the past been used exclusively for cleaning and coating the surfaces of glass panes used for windows. In this connection, reference is being made to an essay by Dr.-Ing. H. Christian Schaefer in "Vakuum in Forschung und Praxis [Vacuum in Research and Practice] (1995) No. 3" The author points out that in accordance with a heat protection decree, each insulating glass must have a heat insulating layer in order to come closer to the requirements of an improved insulation.

However, the measures mentioned above are not sufficient for making it possible to achieve a significant reduction of the K-coefficient to about 0.3 W/m2° K. On the contrary, further efforts are required in practice to be able to realize a mechanical insulation for manufacturing such insulation layers in an economical manner.

Because of the new findings, the required high energy consumption and the necessary financial investments no longer justify a manufacture of structural and/or light elements in accordance with the known methods.

The insulation technology utilized in the past for windows and facades is now outdated for several years, however, further innovations are intentionally suppressed.

It is only a structural and/or light element according to EP-A-0 247 098, which makes possible a K-coefficient of less than 0.4 W/m$^2$° K, that a further development of an economically interesting manufacture of structural and/or light elements can be carried out under rational and successful conditions.

SUMMARY OF THE INVENTION

Therefore, starting from the prior art discussed above, it is the primary object of the present invention to manufacture in an economical manner structural and/or light elements of the above-described type with high insulation values which have not been achieved in the past, and to use these elements in new buildings as well as in existing buildings and installations.

In accordance with the present invention, the wall elements pretreated for a structural and/or light element are guided in a manufacturing procedure over manufacturing sections, wherein the edges of each wall element are coated with solder on at least one side thereof, support elements are placed spaced apart on a wall element, subsequently the wall elements are positioned opposite each other while maintaining a distance determined by the support elements, and the wall elements are enclosed to form a gas-tight hollow space by means of a deformable metal sealing element attached to the coated edges of the two wall elements.

The method according to the invention makes possible an economical manufacture of structural and/or light elements constructed as windows, roof elements or facade elements, also for greenhouses, with a K-coefficient which is lower than any achieved in the past.

In accordance with an alternative embodiment, the solder layer can also be attached to a wall element after the support elements have been mounted on the wall element.

In accordance with an advantageous feature, the wall elements intended for a structural and/or light element to be provided with an evacuated hollow space travel through a room which can be separated into at least one manufacturing chamber which can be evacuated and is equipped in accordance with a certain manufacturing method, so that it is possible to adjust optimum conditions for the manufacturing method taking place in this room.

For achieving an economical manner of operation, the wall elements used for a structural and/or light element are moved through the manufacturing sections one behind the other, next to other, above each other, staggered next to or above each other.

Since the method according to the invention requires a high degree of automation for manufacturing the structural and/or light elements, it is advantageous to construct the manufacturing sections provided for manufacturing procedures as manufacturing rooms, wherein the manufacturing rooms are provided with a vacuum adjusted to the manufacturing method to be carried out in the room.

The previously known cleaning of the wall elements and the subsequent application of a heat reflecting layer under vacuum in a so called flat glass coating plant could be carried out prior to the method of the invention and the two methods could be combined in a manufacturing sequence. This would make it possible to continue to operate existing flat glass coating plants (about 40 in Europe) together with the method of the invention. By connecting the flat glass coating plant and the method according to the invention, the structural and/or light element can be constructed in a simple manner with a significantly more efficient cleaning effect and with a higher quality of the infrared layer. This technical as well as economic advantage makes it unnecessary to heat the pretreated or infrared layer-coated wall elements at a temperature of about 400° C. for removing the water skins which form within the shortest time in an atmospheric surrounding. A coating would not survive such a measure undamaged and, in the case of an evacuation, such a measure would lead to a continuous high gas discharge rate.

When a pretreatment section for cleaning and coating the wall elements with a heat radiation reflecting layer is provided it is advantageous if a conveying and manufacturing connection is provided between the pretreatment section and the subsequent manufacturing section for carrying out the method according to the invention.

The pretreatment section in the form of at least evacuatable manufacturing section in which the wall elements are cleaned and/or provided with an infrared layer or low E-layer, can also be arranged perpendicularly relative to the installation according to the present invention, such that the conveying direction used for pretreating the wall elements extends at a right angle relative to the conveying direction of the installation according to the invention and ends at the beginning of the latter. When the infrared-coated wall elements are further processed into structural and/or light elements, they deflected by about 90 degrees into the conveying direction of the insulation of the invention without leaving the evacuated surrounding.

However, if the wall elements are exclusively provided with an infrared layer, they can be removed from the flat glass coating section or pretreatment section in the conveying direction of this pretreatment section. In other words, the method and/or installation according to the present invention could be combined with an existing flat glass coating plant and could be universally operated as a result and the efficiency and output could be markedly improved.

Because of the different manufacturing methods, the manufacturing sections are advantageously constructed as manufacturing rooms.

In order to optimize and adapt the manufacturing rooms to the manufacturing methods, it is important for achieving an economical manufacture of the structural and/or light elements that the manufacturing rooms which can be evacuated can be constructed so as to be separable from each other, so that each manufacturing section determined for a manufacturing method to be carried out can be utilized in an optimum manner.

The manufacturing rooms are arranged particularly advantageously if, after the wall elements have been cleaned and/or provided with a heat radiation-reflecting layer and immediately subsequently the edge coatings for later attaching the edge sealing element have been applied to the wall elements, at least two one of the wall elements are transferred the support elements required for the spacing of the wall elements in a distributed configuration, subsequently the wall elements are positioned relative to each other at the distance of the transferred support elements, and subsequently the wall elements are enclosed with the resilient metal edge sealing elements so as to form a hollow space which is evacuated or can be evacuated. This manner of operation makes it possible to carry out the individual manufacturing steps continuously and in a simple manner to carry out the manufacturing method according to the present invention.

For achieving an optimum connection of the wall elements at the edges by means of the sealinq element by utilizing the evacuatable manufacturing rooms, it is advantageous to carry out the coating of the edges by means of physical or chemical separation of the material from the gas or vapor phase, as described, for example in EP-A-0 434 802.

Because of the high energy quantities required for producing the vacuum, it is recommended that the evacuated manufacturing sections are constructed so that they can be separated from each other when manufacturing interruptions occur.

The manufacturing sections can be constructed in such a way that the wall elements travel therethrough vertically or horizontally, so that the manufacturing rooms and the devices provided therein can be used in an optimum manner.

An installation for carrying out the method includes a conveying device for transporting the wall elements on a manufacturing line composed of several manufacturing sections, wherein at least portions of the conveying device are connected to a vacuum source for forming a vacuum environment, and wherein appropriate manufacturing devices are provided for the manufacturing sections.

The manufacturing sections are advantageously constructed for forming an edge coating at the wall elements, for placing support elements on the wall elements, for joining at least two wall elements together and for mounting a deformable metal sealing element at the edges of the joined wall elements, wherein this or another sequence may be used, so that a problem-free manufacturing process can be carried out.

For effecting a direct connection between the manufacturing rooms, the passage openings are provided as in the prior art with closing flaps or slides, so that the pressureless condition can be cancelled in individual manufacturing rooms and access to the installed manufacturing devices is possible.

The possibility of combining the installation according to the invention with an existing flat glass coating plant has already been described above; however, it must additionally taken into consideration that the combination between the plants requires a connection which can be evacuated; this does not require any special features because the coating section of the flat glass coating plant is already constructed so that it can be evacuated.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
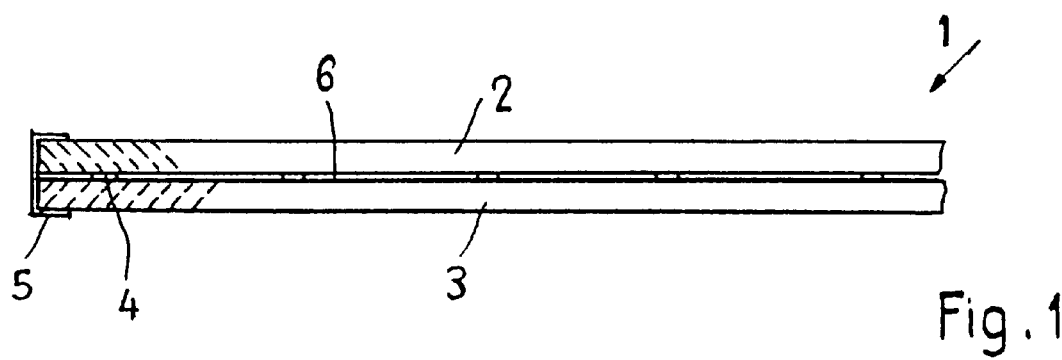
FIG. 1 is a schematic view of a structural and/or light element manufactured according to the method of the invention.

The structural and/or light element described above and shown in the drawing is particularly suitable for windows, as a facade or lining element, or as an insulation element or insulation layer for greenhouses, cooling rooms or cooling installations.

The element can be manufactured with a K-coefficient of less than $0.3 \text{ W/m}^{2\circ} \text{ K}$ in a simple manner, as suggested. In this respect, the light element cannot be distinguished from conventional windows.

When carrying out the method of the invention, the wall elements required for windows with two or three panes must first be cleaned of dirt and moisture, so that no gas discharge is possible in the evacuated surrounding, and a wall element intended for a window with multiple panes is to be provided with a heat radiation-reflecting layer. It is advantageous to carry out these preparation steps immediately prior to the method of the invention, or to connect the manufacturing installations.

The manufacturing process according to the method of the invention takes place in evacuated rooms or chambers which are called manufacturing steps of a manufacturing line, wherein the rooms or chambers are arranged in a row and preferable can be separated from each other. The degree of evacuation in the manufacturing sections depends on the manufacturing method or the negative pressure corresponding to the finished structural and/or light element.

Of course, several process steps can be carried out in a manufacturing section, however, the sequence of the steps is determined by the method of the invention.

The method of the invention provides for a manufacturing process which can be automatically carried out by a control which is operated by a programmed computer; a regulation may also be provided.

The method of the invention can begin immediately following an integrated pretreatment of the wall elements by coating the edges of two wall elements; subsequently, support elements which adhere to the wall elements are preferably placed on one of the inner sides of the wall elements facing each other in regular spacings and the wall elements are then joined together in the manner of a sandwich, and the wall elements are then enclosed with a sealing element to form an intermediate space which is evacuated or can be evacuated.

An additional further evacuation of the finished structural and/or light element can be carried out if desired after the manufacturing process, for example, on or after the last manufacturing section.

The manufacturing sections constructed as chambers or rooms are equipped with devices and units for a certain manufacturing method which is intended for carrying out the method of the invention.

The manufacturing sections are optionally arranged one behind the other, next to each other, above each other or offset next or above each other in the sequence of the manufacturing methods determining the method, so that an advantageous or economical manufacturing sequence is achieved for the arrangement of the machines or installations.

The vacuums required for the manufacturing sections are not cancelled during the carrying out of the manufacturing method and can be exchanged between the manufacturing sections.

For an economically optimum operation, the manufacturing sections are provided with different degrees of evacuation depending on the manufacturing method carried out in each manufacturing section.

The wall elements may travel in pairs or individually placed horizontally and/or vertically through the manufacturing sections, so that an optimum utilization of the individual work methods and an optimum use of space are obtained.

FIG. 1 of the drawing shows a structural and/or light element 1 manufactured by the method of the invention. The element 1 is composed of two wall elements 2, 3 formed of glass panes which are separated from each other by support elements and are tightly enclosed at the edges. By enclosing the wall elements by means of a flexible hoop tightly connected to the outer sides of the wall elements 2, 3, for example a metal strip 5, an intermediate space 6 is created between the wall elements 2, 3 which can be evacuated or supplied with gas. Such an arrangement is described and illustrated in EP-A-0 434 802.

Figure 2:
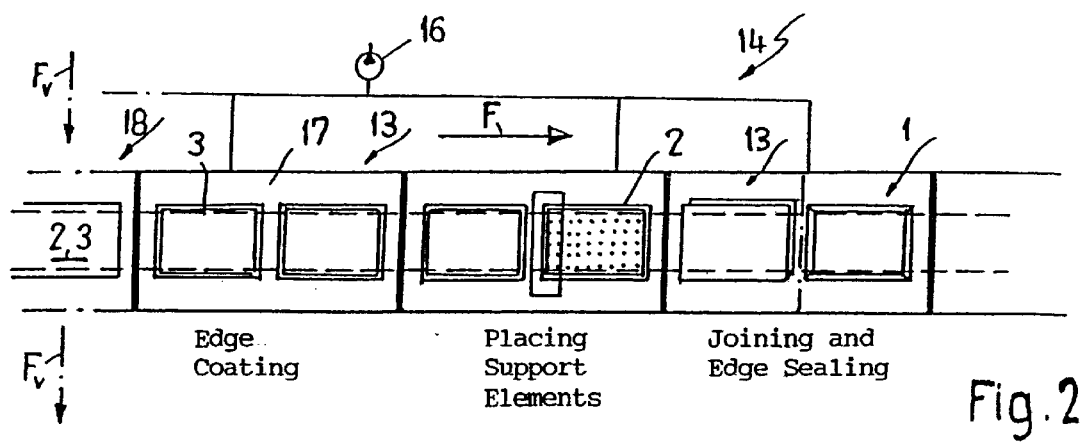
FIG. 2 is a schematic top view of an installation for carrying out the method of the invention for manufacturing a structural and/or light element shown in FIG. 1.
Figure 3:
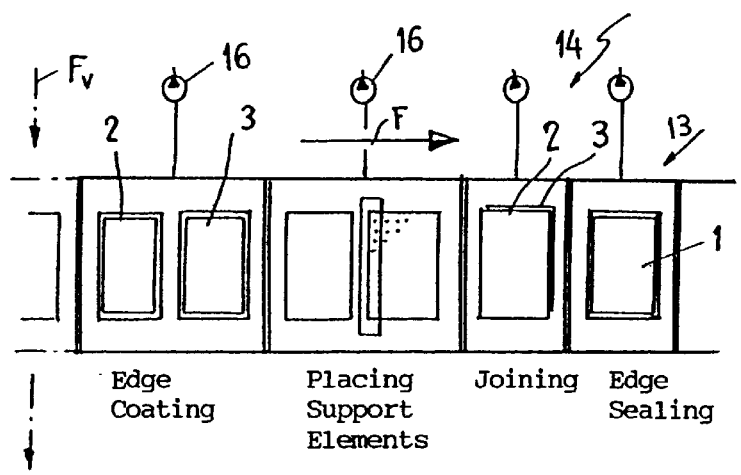
FIG. 3 is a schematic top view of another installation for carrying out the method of the invention for manufacturing a structural and/or light element shown in FIG. 1.
Figure 4:
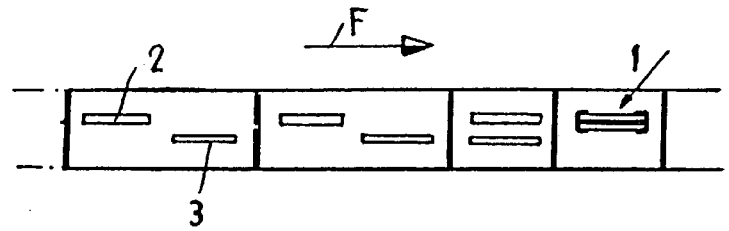
FIG. 4 is a schematic top view of another installation for carrying out the method of the invention.

FIG. 2 shows an embodiment of an installation for carrying out the method of the invention for manufacturing the structural and/or light element 1 shown in FIG. 1. The installation 11 includes a manufacturing line 14 composed of several manufacturing sections 13, wherein the wall elements 2, 3 intended for a structural and/or light element 1 are conveyed by a conveying device 12 in the conveying direction F. Also conceivable is a manufacturing line 14 which, because of manufacturing methods having durations of different lengths, has several parallel manufacturing sections, as shown, for example, in FIG. 5 in connection with edge coating, wherein the parallel manufacturing sections can then or later be joined together or the manufacturing process for the structural and/or light elements can be finished on this manufacturing section.

If suitable, manufacturing methods can also be carried during the transport of the wall elements 2, 3 and, thus, the travel times can be shortened and used in an optimum manner.

Figure 5:
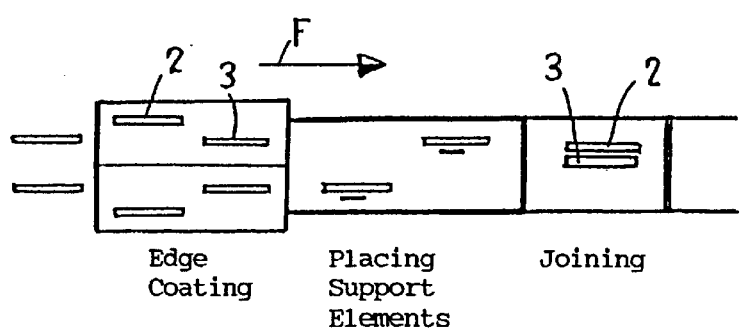
FIG. 5 is a schematic top view of another installation for carrying out the method of the invention.

The conveying device 12 may be composed, for example, of a plurality of frames, no shown, to which the wall elements 2, 3 are releasably connected. The frames may be connected to revolving traction members, they may be movable or guided. The frames are driven with the timing of the manufacturing step which takes the longest or, as already mentioned above, individual manufacturing sections 13 may have parallel manufacturing devices for effecting a continuous manufacturing process, as seen in FIG. 5. The manufacturing sections intended for one or more manufacturing steps, which may also be arranged parallel to each other, may also be provided with their own conveying devices which transfer the wall elements 2, 3 from one conveying device to another conveying device of the next following manufacturing section.

The manufacturing sections 13 which follow each other in accordance with the method are arranged linearly in the embodiments of FIGS. 2–5; however, they may also be arranged successively with changes of directions.

The individual manufacturing sections 13 are labeled in the drawing with the partial procedures taking place. The manufacturing sections 13 are arranged in a row and, where necessary, can be separated from each other by lock-like devices 15, such as closing flaps or the like. During operation, an evacuated or conditioned surrounding exists within the manufacturing sections 13 as required for treating and processing the wall elements 2, 3, wherein the surrounding can be cancelled in a special case in a manufacturing section 13 and can subsequently be reestablished. For this purpose, the manufacturing sections 13 are connected to vacuum sources or pumps 16 which can be switched on and off.

As illustrated in FIG. 2, the wall elements 2, 3 intended for a structural and/or light element 1 travel in pairs through manufacturing section 13 which is designed for at least one manufacturing method. The wall elements 2, 3 which have previously been cleaned in a pretreatment step and been provided with a heat-reflecting layer are moved into a first chamber 17 forming a manufacturing section 13 for coating the edges for mounting a sealing element 5.

The installation for cleaning and providing the low E-coating, also known as flat glass coating plant, may also be arranged instead of linearly as shown in FIG. 1, at a right angle relative to the installation according to the invention, wherein the front end of the coating plant is connected in a vacuum-tight manner to the installation of the invention, so that, in the conveying direction $F_v$ at a right angle to the manufacturing line of the structural and/or light elements it is still exclusively possible to produce wall elements with low E-coated surfaces (in an existing flat glass coating plant).

The first manufacturing section of the manufacturing line could then be divided into two subsections, wherein the front subsection seen in the conveying direction F could be used for cleaning the edges, for example, by means of high frequency, and the subsequent subsection could be used for coating the previously cleaned edges of the wall elements 2, 3 using the same vacuum. For keeping the coating room clean, the subsections could be separated from each other by separating elements.

As is the case in the prior art, always between two evacuatable manufacturing sections 13 are provided narrow closeable openings through which the wall elements 2, 3 are transported; such a manufacturing plant is disclosed, for example, in European Patent Application No. 00 810 091.

For carrying out the method of the invention, the installation 1 is separated into manufacturing sections 13 in which are carried out a special pretreatment at the wall elements 2, 3 for the edge coating and the immediately following coating of the edge regions, the application or placement of support elements or spacer members on a wall element, the joining of a least two wall elements 2, 3 and the enclosing of the wall elements 2, 3 by a sealing element surrounding the edges of the structural and/or light element 1.

In accordance with a prior step of the method, the wall elements 2, 3 whose surfaces have been cleaned and which have been provided with a heat-reflecting layer are in their edge areas prepared for applying a metal sealing element by soldering to the glass. For achieving a high degree of purity, it is necessary to remove any existing dirt and water and an outer contaminated layer of the glass. Various methods are suitable for this purpose, wherein an evacuated surrounding during the treatment and the subsequent coating is indispensable. Coating methods which can be used in this connection are described in EP-A-0 434 802.

Separate manufacturing sections can be used for carrying out the method, wherein initially the cleaning method and subsequently in the next manufacturing section the coating of the edge could be carried out.

Of course, only a single manufacturing section could also be used for this purpose.

Because of the different manufacturing methods carried out in the manufacturing sections 13, the manufacturing sections 13 may have different sizes.

The devices and installations used in the evacuated rooms are equipped with materials from which gas hardly is discharged in a vacuum.

After mounting the layer on the wall elements 2, 3 intended for an edge sealing, the wall elements 2, 3 are transferred to the next manufacturing section where support elements are placed on the wall elements 2, 3 for the later formation of a space 6 between the wall elements 2, 3. It is advantageous to place the support elements 4 distributed in regular intervals on the wall elements 2, 3. The support elements 4 may adhere to the wall elements 2, 3.

Subsequently, the wall elements 2, 3 are joined in a manufacturing section spaced apart from each other by the height of the support elements. In other words, the wall elements 2, 3 are placed on top of each other or laterally against each other.

This step could also be carried out together with the subsequent manufacturing step in which the wall elements 2, 3 are enclosed by an edge sealing element 5, especially since the connection of the wall elements 2, 3 with a middle strip should advantageously take place in an evacuated surrounding.

By travelling through the manufacturing sections 13, the wall elements 2, 3 pass through manufacturing installations of the manufacturing sections 13, wherein the manufacturing installations are moved into the appropriate manufacturing positions by robots. The manufacturing installations as well as the robots are controlled by a computer, not shown. The configuration and operation of the manufacturing installations and of the robots are not part of the present invention and, therefore, are not illustrated or described.

FIGS. 2–5 of the drawing illustrate different manufacturing positions of the wall elements 2, 3 in the manufacturing sections 13; it is possible that the wall elements 2, 3 change their positions once or several times during the manufacturing process until the structural and/or light element 1 is manufactured, i.e., the wall elements 2, 3 may change their positions from horizontal to vertical and vice versa.

While specific embodiments of the invention have been shown and described in detail to illustrate the inventive principles, it will be understood that the invention may be embodied otherwise without departing from such principles.

What is claimed is:

1. A method of manufacturing heat-insulating structural and/or light elements composed of at least two wall elements of glass, a glass alloy or metal, wherein the wall elements are separated from each other by support elements and are provided on at least one of surfaces thereof facing each other with a layer reflecting heat radiation, and wherein the structural and/or light elements further are composed of a deformable sealing element for connecting the wall elements to obtain a hollow space between the wall elements which can be evacuated or supplied with gas, the method comprising conveying wall elements which have been cleaned and coated on at least one surface thereof and are intended for a structural and/or light element in a manufacturing line extending over manufacturing sections, coating with solder at least one side of each wall element at edges thereof, placing spaced-apart support elements on a wall element, positioning the wall elements opposite each other at a distance determined by the support elements, and subsequently enclosing the wall elements to form a gas-tight hollow space between the wall elements by applying a deformable metal sealing element at the coated edges of both wall elements.

2. The method according to claim 1, comprising applying the solder layer after placing the support elements on a wall element.

3. The method according to claim 1, wherein the wall elements intended for a structural and/or light element provided with an evacuated hollow space travel through at least one evacuatable manufacturing section equipped for a specific manufacturing method.

4. The method according to claim 1, wherein the wall elements intended for a structural and/or light element travel through the manufacturing sections one behind the other, next to each other, above each other or offset next or above each other.

5. The method according to claim 1, wherein the manufacturing sections are rooms which can be separated, comprising applying a vacuum to each room in accordance with the manufacturing method being carried out.

6. The method according to claim 1, comprising carrying out a pretreatment step for cleaning and/or applying a heat radiation-reflecting layer on the wall elements, wherein the pretreatment step is a manufacturing section of the manufacturing method.

7. The method according to claim 6, wherein the pretreatment step is connected to the subsequent manufacturing sections of the manufacturing method.

8. The method according to claim 1, wherein the manufacturing sections are manufacturing rooms which can be separated from each other.

9. The method according to claim 1, comprising, after carrying out the edge coating of the wall elements, placing the support elements on at least one wall element, subsequently joining the wall elements intended for a structural and/or light element at a distance of the support elements, and then conveying the wall elements to an enclosing step for mounting the edge sealing element.

10. The method according to claim 1, wherein the wall elements travel through the manufacturing sections vertically and/or horizontally.

11. The method according to claim 1, comprising carrying out a further evacuation of the hollow space between the wall elements after the sealing element is mounted.

* * * * *